United States Patent
Nakabayashi

[11] Patent Number: 5,675,672
[45] Date of Patent: Oct. 7, 1997

[54] TWO DIMENSIONAL LINKER FOR CHARACTER STRING DATA

[75] Inventor: Kaoru Nakabayashi, Suwa, Japan

[73] Assignee: Seiko Epson Corporation, Tokyo, Japan

[21] Appl. No.: 395,230

[22] Filed: Feb. 27, 1995

Related U.S. Application Data

[63] Continuation-in-part of Ser. No. 173,958, Jun. 7, 1993, which is a continuation of Ser. No. 721,796, Jun. 26, 1991, abandoned.

[30] Foreign Application Priority Data

| Jun. 26, 1990 | [JP] | Japan | 2-167384 |
| Apr. 2, 1991 | [JP] | Japan | 3-69941 |

[51] Int. Cl.⁶ .................. G06K 9/22; G06K 9/34
[52] U.S. Cl. .................. 382/318; 358/450; 382/284; 382/294
[58] Field of Search .................. 358/450, 540; 382/282, 284, 318, 294, 321; 348/584, 598; 395/135

[56] References Cited

U.S. PATENT DOCUMENTS

| 3,962,681 | 6/1976 | Requa et al. | 382/318 |
| 3,976,982 | 8/1976 | Eiselen | 382/284 |
| 4,048,617 | 9/1977 | Neff | 340/146.3 |
| 4,092,632 | 5/1978 | Agulnek | 382/284 |
| 4,272,756 | 6/1981 | Kakumoto et al. | 382/284 |
| 4,488,678 | 12/1984 | Hara et al. | 235/463 |
| 4,860,377 | 8/1989 | Ishigaki | 382/59 |
| 4,949,391 | 8/1990 | Faulkerson et al. | 382/56 |
| 5,140,647 | 8/1992 | Ise et al. | 382/284 |
| 5,377,330 | 12/1994 | Kubota et al. | 395/148 |
| 5,524,071 | 6/1996 | Yokomizo | 382/284 |

*Primary Examiner*—Joseph Mancuso
*Assistant Examiner*—Timothy M. Johnson
*Attorney, Agent, or Firm*—W. Glen Johnson

[57] ABSTRACT

A two-dimensional coded character string linker for eliminating duplications when first and second two-dimensional coded character string files partially overlap each other, by automatically deleting the duplicated coded character data from one file, and linking the two-dimensional coded character string files. In order to achieve this object, in the two-dimensional file linker of this invention, any duplications between a first file written into a first memory and a second file written into a second memory are identified by an aligner. A linking element removes any duplication, and links the first and second files as one two-dimensional coded character string file.

17 Claims, 7 Drawing Sheets

TWO DIMENSIONAL LINKER FOR CHARACTER STRING DATA

CROSS-REFERENCE TO RELATED APPLICATIONS

This application is a continuation-in-part application of U.S. Ser. No. 08/173,958, entitled "TWO-DIMENSIONAL FILE LINKER FOR CHARACTER STRING FILES", filed Jun. 7, 1993, which is a file wrapper continuation of U.S. Ser. No. 07/721,796, filed Jun. 26, 1991, which has been abandoned.

BACKGROUND OF THE INVENTION

I. Field of the Invention

The present invention relates generally to optical character recognition (OCR) in computer systems, and more specifically it relates to devices and methods of seamlessly joining or linking two-dimensional coded character string files that bridge between scanned document images.

II. Discussion of the Related Art

OCR systems that read text and printed words from pages directly into a computer save a lot of labor and reduce errors in an otherwise very tedious process. These OCR systems are commercially available in a wide array of shapes and sizes, but most basically consist of hardware to scan in an image (bit map) and software to recognize printed letters and numbers. For example, a typical system for the Macintosh personal computer comprises a Hewlett-Packard SCANJET PLUS™ flat-bed document scanner and ACCUTEXT™ software from Xerox. Other suppliers, such as Caere of San Jose, Calif., produce handheld scanners that are stroked over the surface of a document containing images to be input and utilize an OCR program such as the one called RECOGNIZE.

The use of flat-bed scanners usually cause unnecessary header and footer data that appears at the top and bottom of each document page to be read and inserted into the middle of any phrase and/or paragraph that are split between pages. The use of handheld scanners can actually cause inputted data to be duplicated, because as the handheld scanner is moved about, a second stroke of the scanner may inadvertently include the bottom, top or side part of an image scanned during the first stroke. The prior art devices simply join the first and second scans. This means that character strings, phrases, and, sometimes whole paragraphs, are often duplicated.

In computer systems, a conventional string linker simply links the end portion of a first string character file to the header portion of a second string character file. However, simple linking often results in inconvenience. For example, when a long document, e.g., an article in a magazine, is read by a handheld scanner in a plurality of scanning operations, and the read image data are converted into string character data by a string character recognition unit, string character data obtained by the first reading operation may partially overlap string character data obtained in the next reading operation. In this case, by using a conventional string character linker, any duplicated portion must be manually checked and deleted.

In addition, other character recognition devices must utilize dedicated scanners which scan the document in a controlled manner to insure that each scan can be referenced back to a common absolute coordinate system. In this manner, each scan is coordinate dependent with the other scan. The image data of each of these scans is then linked by comparing X and Y coordinates of the characters that have been scanned to the common absolute coordinate system. If there is a coincidence in the coordinates, the device assumes a match and eliminates the duplicated characters.

However, these types of character recognition devices also have several disadvantages. For example, when different pages of a document are scanned or images separated on two separate sheets are scanned in two sessions, the scans cannot be merged because each scan cannot be referenced back a common absolute coordinate system. Moreover, if a document is removed from the scanning device, and later scanned, it cannot be merged with the previous scan because there may be a shift in coordinates. For instance, if there is a shift by only one (1) pixel, the device would not be able to merge the duplication resulting from both scans. This makes it extremely difficult, if not impossible to use a handheld or portable scanning device.

What is needed then, is a two-dimensional file linker which does not suffer from the above-mentioned disadvantages. This will, in turn, eliminate the need for each scan having to be referenced back to a common absolute coordinate system or being coordinate dependent with one another, eliminate the need for scanning in a controlled manner, and eliminate duplications which typically occur by scanning the document with a handheld scanner. Moreover, such a device will be able to identify character duplications without the need for comparing the coordinates of where the characters appeared in a scan. It is, therefore, an object of the present invention to provide such a two-dimensional file linker for coded character string files.

SUMMARY OF THE INVENTION

The object of the present invention is to provide a two-dimensional file linker in an OCR system that automatically identifies duplications between a first and a second two-dimensional coded character string file, eliminates the duplications, and then seamlessly joins the coded character string files.

A file linker constructed according to a first embodiment of the present invention comprises random access memories to store first and second two-dimensional coded character string files, an aligner for comparing the first and second two-dimensional coded character string files, and linking means for seamlessly linking the first and second two-dimensional coded character string files such that string duplications of coded characters that would otherwise exist, are eliminated by comparing the coded characters, independent of the coordinates of the characters. The aligner detects overlaps between the first and second two-dimensional coded character string files. The linking means deletes the duplications, and seamlessly joins together the first and second two-dimensional coded character string files into one file.

An advantage of the present invention is that when a plurality of two-dimensional coded character string files partially overlap each other, duplications are automatically identified, the redundancy is deleted, and the two files are then joined.

Another advantage of the present invention is that a user need not manually edit and delete any duplications. This eliminates a source of error and reduces file compilation effort. In particular, the present invention is effective for large-size documents having multiple columns, e.g., magazine articles and newspapers.

A further advantage of the present invention is that the first two-dimensional coded character string file is coordinate independent of the second two-dimensional coded character string file. This allows the use of a handheld scanner as opposed to dedicated scanning devices in which each scan can be referenced back to a common absolute coordinate system. Because of this, duplications in the first and second two-dimensional coded character string files can be located and eliminated without using the coordinates of where the characters actually appeared in the scan.

These and other objects and advantages of the present invention will no doubt become obvious to those of ordinary skill in the art after having read the following detailed description of the preferred embodiments and which are illustrated in the various following drawing figures.

DETAILED DESCRIPTION OF THE PREFERRED EMBODIMENT

The following description of a two-dimensional file linker for two-dimensional coded character string files is merely exemplary in nature and is in no way intended to limit the invention or its application or uses.

Figure 1:
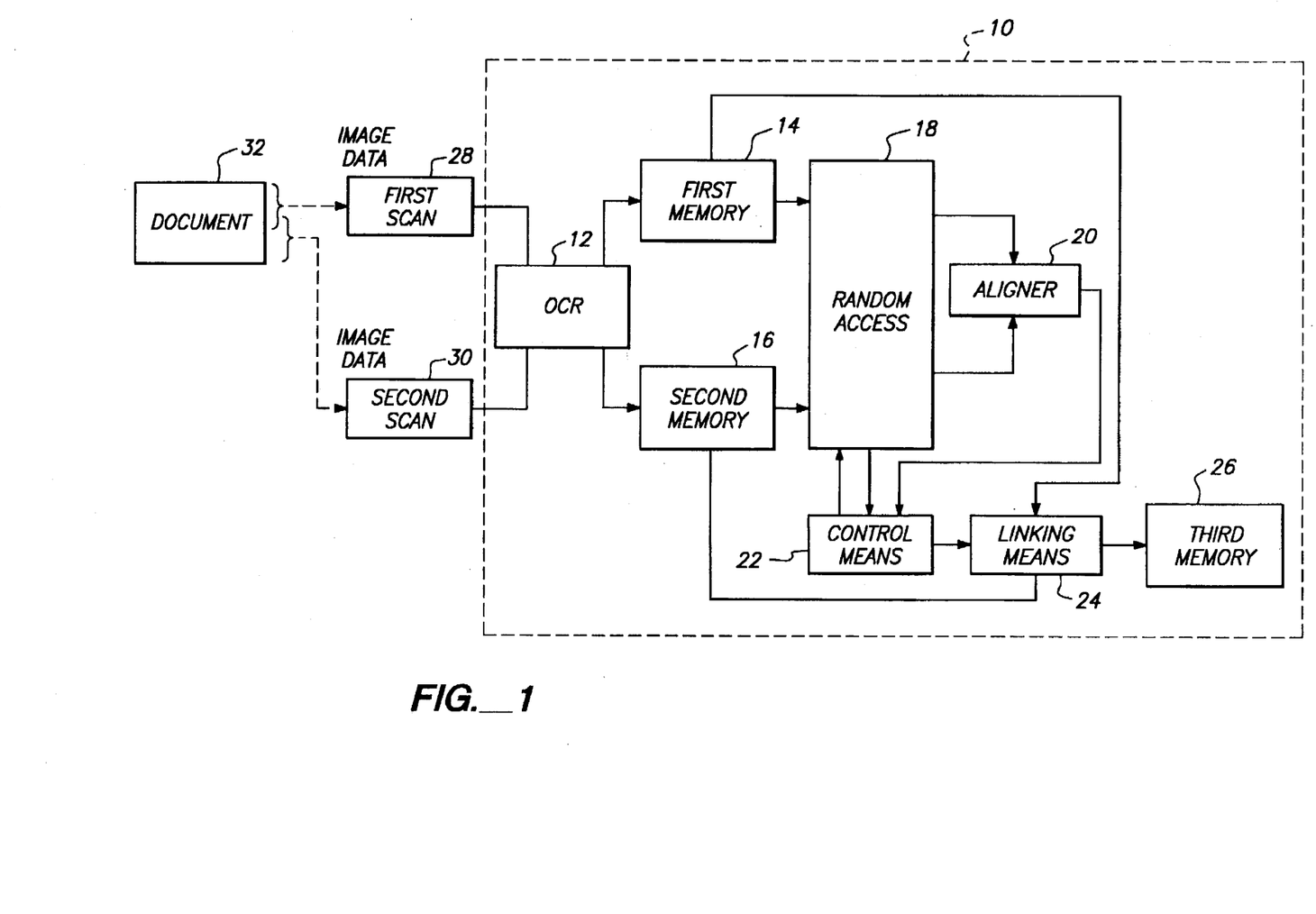
FIG. 1 is a functional block diagram of a two-dimensional file linker constructed and operating according to a first embodiment of the present invention.

Referring to FIG. 1, a two-dimensional file linker 10, is constructed and operated according to a first embodiment of the present invention. The file linker 10 includes an optical character recognition (OCR) device 12, a first memory 14, a second memory 16, a random access 18, an aligner 20, a control means 22, a linking means 24 and a third memory 26.

Figure 2:
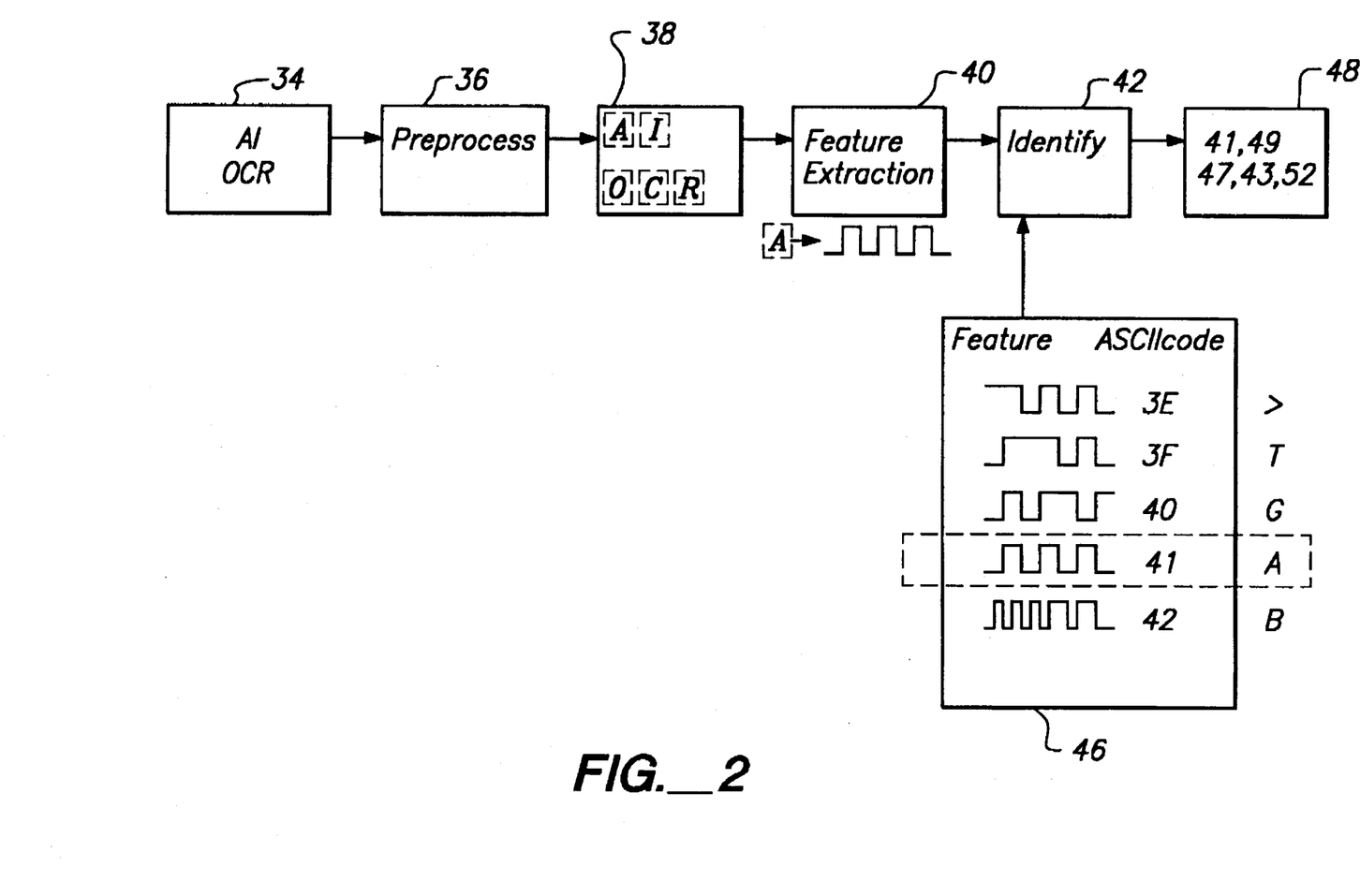
FIG. 2 is a functional block diagram of the OCR shown in FIG. 1.

The operation of the OCR 12, as shown in FIG. 2, begins by inputting video or image data from either a first scan 28 or a second scan 30 of a document 32 such that the first scan 28 is coordinate independent of the second scan 30. In other words, the first scan 28 and second scan 30 are not referenced to a common absolute coordinate system, generally resulting from scanning using dedicated scanning devices, but would each have a separate individual coordinate system. For example, a pictorial representation of image data "A I O C R" inputted to the OCR 12 from either the first scan 28 or the second scan 30 is shown in block 34. The image data of block 34 is then preprocessed in block 36. This preprocessing 36 includes performing: 1) noise deletion; 2) cutting out of a circumscribed outline on each character; and 3) a normalization process. The noise deletion preprocess eliminates any spurious data resulting from scanning the document 32 using techniques known in the art. The second preprocess step essentially cuts out a circumscribed outline or border about each character found in block 34 by using character segmenting. Once the circumscribed border has been determined for each character, a normalization of each circumscribed border is performed by a standardization process which essentially centers each character within an outer border (shown as a dotted line around the characters) based on the circumscribed outline or border of each character.

After the preprocessing of block 36 is performed on the image data 34, normalized data of each character is generated in block 38, as indicated above. At block 40, feature extraction is performed on each normalized character by the OCR 12 to generate a digital signal which represents the character that has been extracted. Each digital signal which represents a character is then identified at block 42 by utilizing a dictionary 46 which matches the digital signal to the hexadecimal ASCII code representing that character. The coded ASCII representation of each character is then put in the order as it appears as a character, in block 48, independent or without the specific coordinates of where the characters appeared in the original image date 34.

Returning to FIG. 1, the coded characters 48 generated by the OCR 12 from either the first scan 28 or the second scan 30 are stored in either the first memory 14 or the second memory 16, respectively. The first memory 14 and the second memory 16 are not single dimensional registers that contain a single string of coded characters. Rather, the first memory 14 and the second memory 16 are two-dimensional and store data in two-dimensional coded character string arrays, such as that shown in block 48 by ASCII coding. These two-dimensional coded character string arrays essentially mimic the particular scan 28 or 30 from a handheld scanner as it is moved across the document 32. In other words, both rows and columns of coded characters will be stored in the order or sequence as the original characters appeared to the scanner without the need for identifying the coordinates of where the original characters in the image data appeared and without the first scan 28 being coordinate dependent with the second scan 30. Stated another way, the first scan 28 and the second scan 30 do not have to be referenced back to a common absolute coordinate system (see block 48). That way, edge information (top, bottom, left and right) of each scan 28 and 30 is retained for use in rejoining the files in the first memory 14 and the second memory 16, independent of the coordinates of the coded characters.

Under the direction of the control means 22, random access 18, which is a means for accessing and reading the memory 14 and 16, reads this edge information simultaneously from both the first memory 14 and the second memory 16. The data accessed is compared by the aligner 20, and the place of merging is automatically detected, whether it is top, bottom, right or left. Any match and information on how to overlap the data in the first memory 14 and the second memory 16 are returned to the control means 22 and then to the linking means 24. Data from the first memory 14 and the second memory 16 are then joined and the composite is stored in the third memory 26. The two-dimensional coded character string file in the third memory 26 can then be simply converted from the ASCII coded characters to the actual characters when the file is either printed or viewed.

Figure 3:
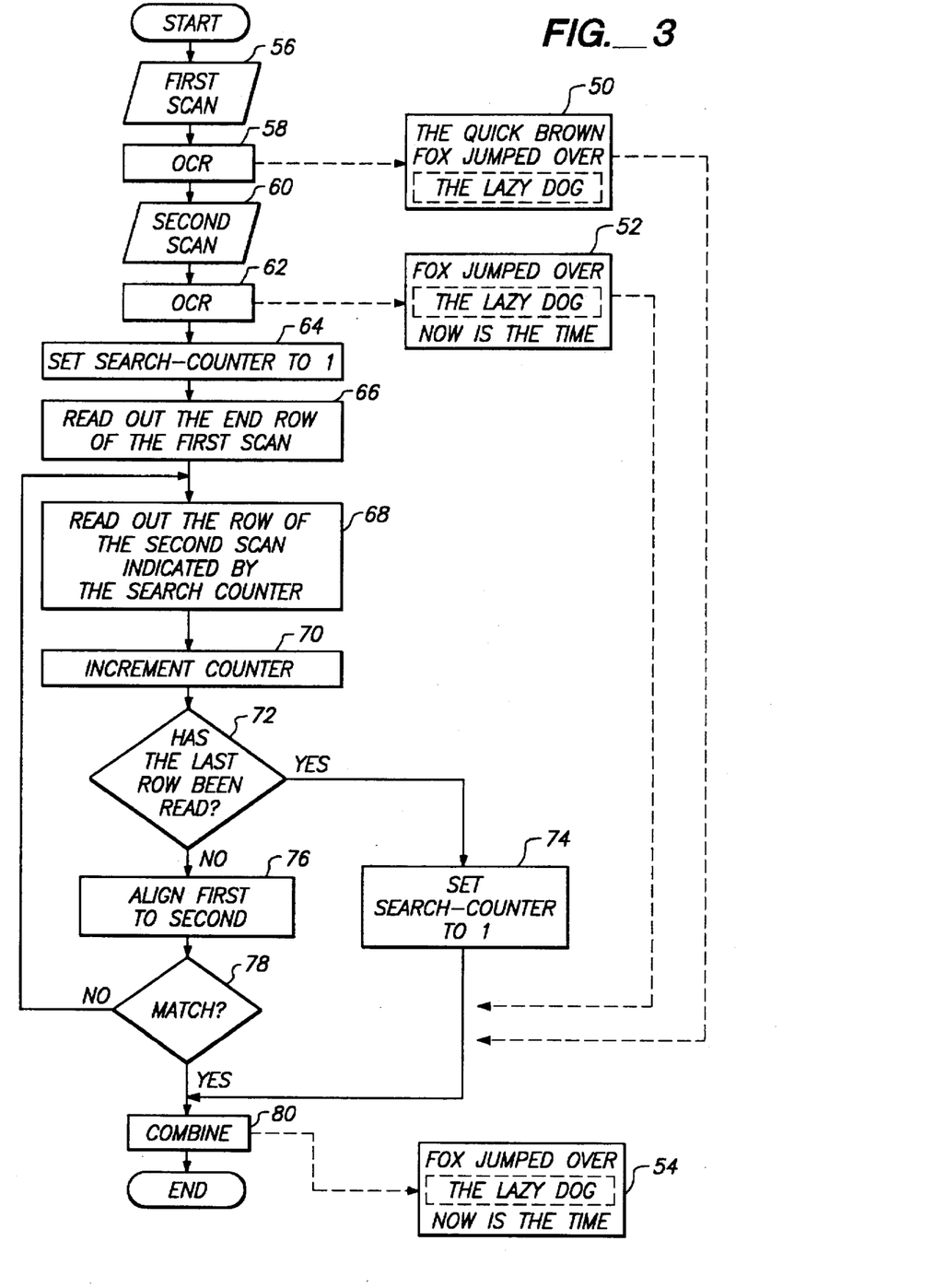
FIG. 3 is a flow chart of a computer-implemented process that executes in the two-dimensional file linker system of FIG. 1.

An example of a computer implemented process, is shown in FIG. 3, that implements part of the first embodiment. Shown on the right of FIG. 3 is a first file 50 and a second file 52 generated from the document 32 which will be joined to produce a composite combined third file 54. It should be noted that the files 50–54 are shown as the characters originally scanned, however, one skilled in the art would recognize that the files 50–54 will actually consist of the two-dimensional coded character string arrays, as shown in block 48, but are shown as the actual character for exemplary purposes only.

The process is started in step 56 by accepting image data 34 during the first scan 28. This data is then read and interpreted by the OCR device 12 in step 58. The OCR device 12 performs the steps shown in FIG. 2 and transmits the first file 50 to the first memory 14. Again, it should be noted that the two-dimensional coded character string array is forwarded to the first memory 14 and not the actual characters, which are shown in file 50, for exemplary purposes only. At step 60, the second scan 30 is performed to accept additional image data 34. This image data 34 is read and interpreted by the OCR device 12 in step 62 to generate the second file 52. The second file 52 which represents the two-dimensional coded character string array is transferred to the second memory 16.

Note how the row which reads "THE LAZY DOG", is duplicated in both the first file 50 and second file 52, in this example. This is an area of overlap that can be detected by comparing the coded characters at the bottom edge of the first file 50 in the first memory 14 to the coded characters at the top edge of the second file 52 in the second memory 16. The random access 18 allows just such a reading of a portion of the files 50 and 52 in memories 14 and 16. The aligner 20 will recognize the coded characters in the row that reads "THE LAZY DOG" (the left edges are equivalent, and so no column adjustment is necessary in this example, but it could be recognized and accomplished if necessary).

In steps 64–80, the combined third file 54 is generated and stored in the third memory 26. In step 64, a search counter "n" is set to one in the control means 22. The end of the first file 50 stored in the first memory 14 is read in step 66 and row "n" of the second file 52 in the second memory 16 is read in step 68. While in step 70, "n" is incremented by one. In step 72, end of file tests are performed to see if the last row of the second file 52 in the second memory 16 has been read. If so, "n" is reset to one, in step 74. Otherwise, in step 76, the first file 50 and the second file 52 are aligned with one another at the current rows that were read in steps 66 and 68. If a match of the coded characters is found in step 78 (by aligner 20), the first file 50 and the second file 52 are combined (by the linking means 24) in step 80 to produce the third file 54 which is stored in the third memory 26.

If no match is found in step 78, the process returns to step 68. It should be noted that the present invention is not limited merely to searches directed to matches by only rows. A search can be made to see if columns match, or a combination of adjusting the column and row will produce a match by comparing ASCII coded characters. Such a condition would occur if the first scan 28 is not aligned or parallel with the second scan 30 which can often occur when using a handheld scanner. Moreover, it should also be noted that the first file 50 and the second file 52 are combined to form the third file 54 based on comparing the coded characters, independent of the coordinates of where the original characters were scanned in the document 32.

Figure 4:
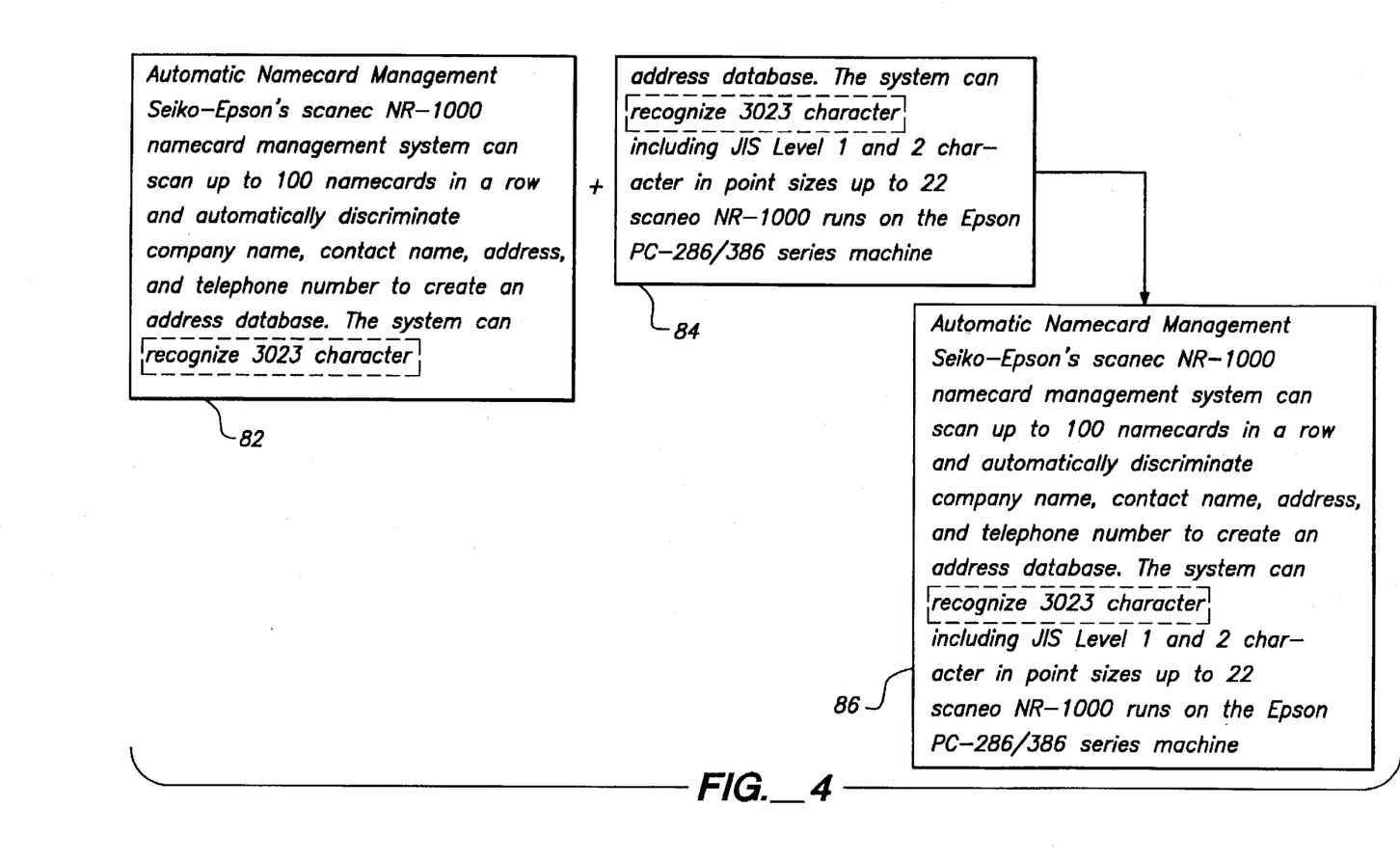
FIG. 4 is a pictorial diagram showing how the top and bottom edges of two files, each of which was obtained in a different pass of a scanner, are joined to form a combined third file having a seamless splice.

To find better matches, data from more than one row can be matched at a time assuming, of course, that much of an overlap exists between files. FIGS. 4–6B illustrate various examples of how files are joined, again showing the actual characters as opposed to coded characters for exemplary purposes only. FIG. 4 illustrates a case where the last two rows of a first file 82 overlap the first two rows of a second file 84. In such a case, the last two rows of file 82, which overlap the first two rows of a second file 84, are deleted and then files 82 and 84 are joined to produce file 86. Of course, any combination of deletions to files 82 and 84 that eliminates the duplication of the two rows is within the scope of the present invention.

Figure 5:
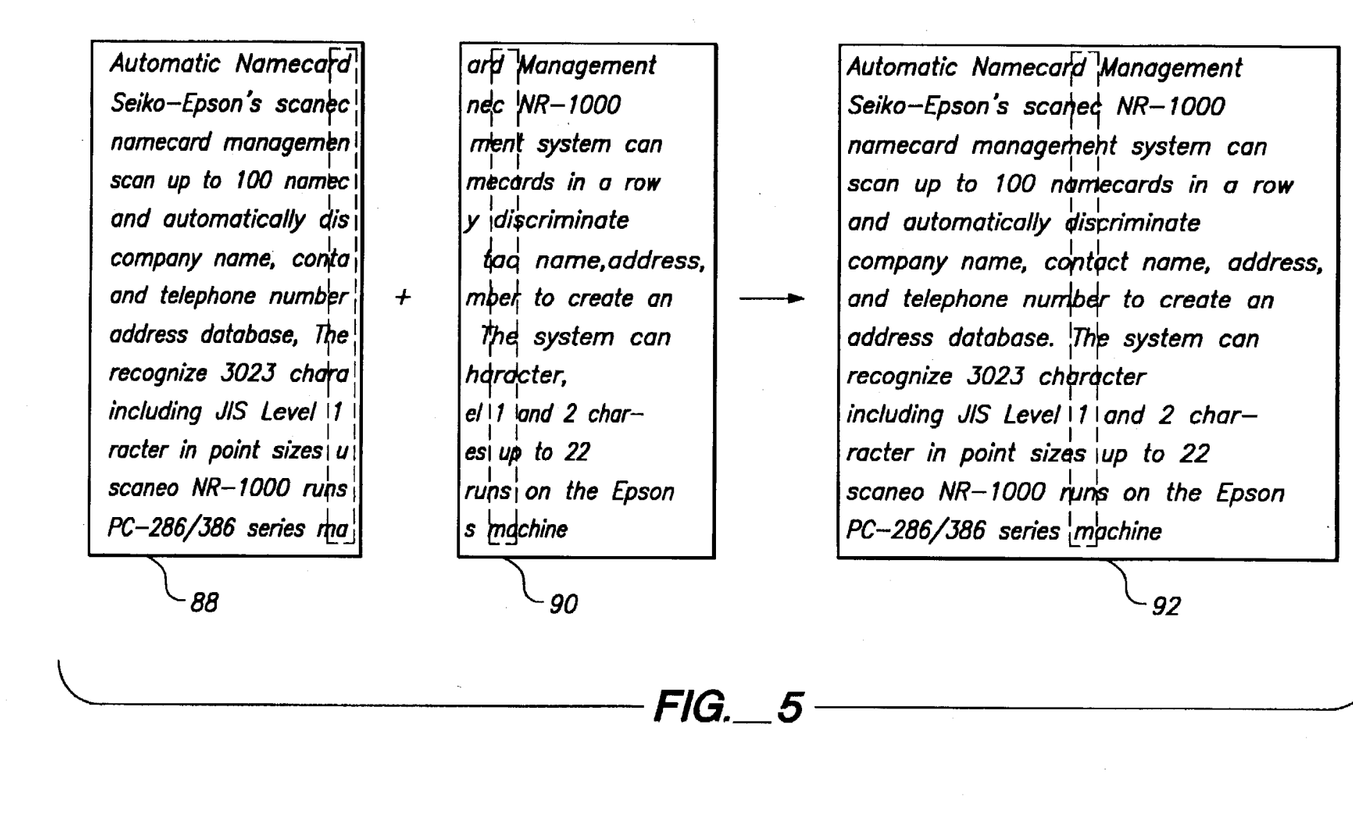
FIG. 5 is a pictorial diagram showing how a right edge of a first file and left edge of a second, each of which was obtained in a different pass of a scanner, are joined to form a combined third wider file having a seamless splice.

FIG. 5 illustrates a situation where the four columns on the right of a first two-dimensional coded character string file 88 overlap the left four columns of a second two-dimensional coded character string file 90. The two files 88 and 90 are illustrated as being in row alignment, but this is not strictly required. (Note, in row 1, how "ard" is duplicated, and in row 9 "hara" from "character" is duplicated.) In this case, the duplications between the four columns on the right and left edges are eliminated and files 88 and 90 are joined to yield file 92 by the file linker 10.

Figure 6A:
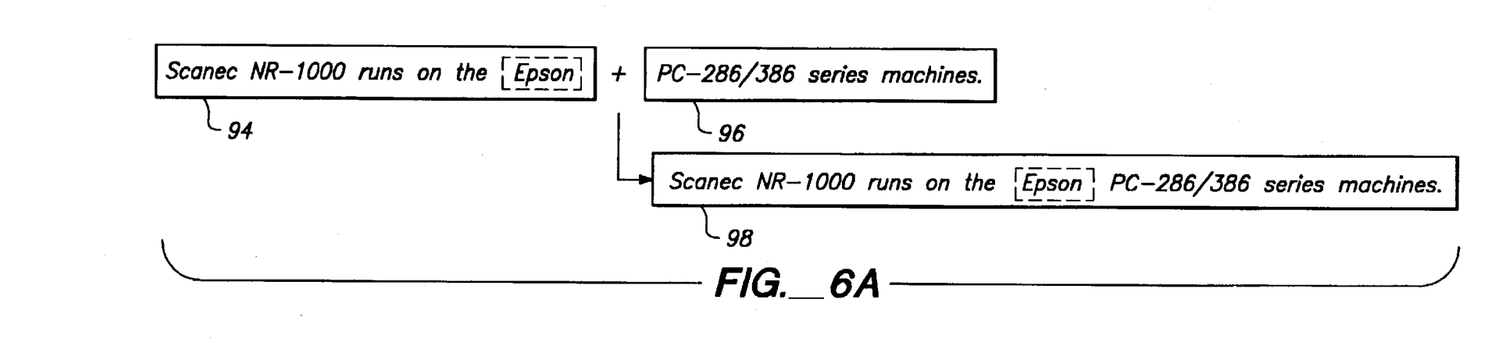
FIG. 6A is an example of a case where two files have no overlap, but are nevertheless properly joined into a larger file.
Figure 6B:
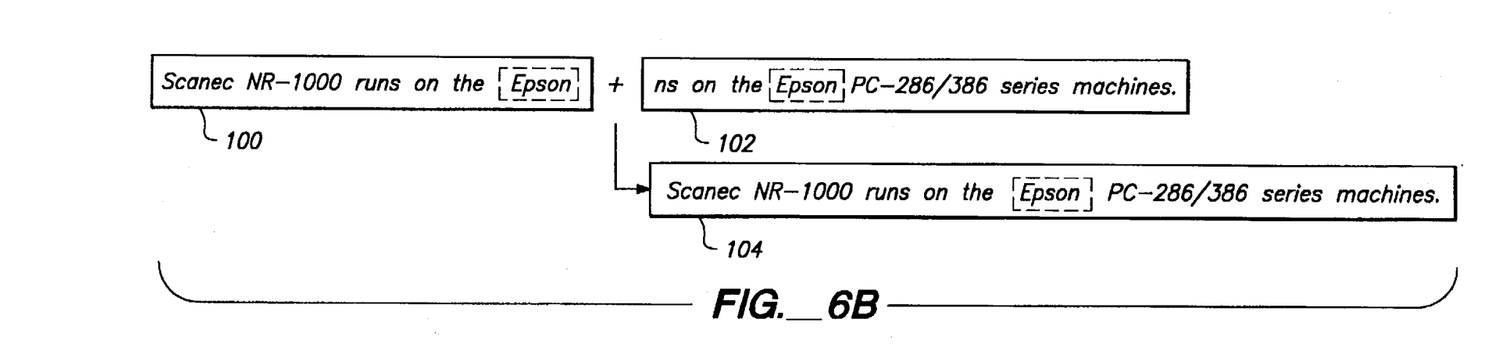
FIG. 6B illustrates a linking example wherein a character string "Epson", as the sixth word of a first two-dimensional coded character string file, overlaps the fourth word of a second two-dimensional coded character string file. In this example, the fourth word of the second two-dimensional coded character string file is linked to the end of the first two-dimensional coded character string file to form a third two-dimensional coded character string file.

FIG. 6A illustrates a case where "Epson" in a first two-dimensional coded character string file 94 does not exist in a second two-dimensional coded character string file 96. Nevertheless, the head or beginning of file 96 is linked to the end of file 94 to form a third two-dimensional character string file 98. FIG. 6B illustrates an example where the phrase "Epson" in first two-dimesional coded character string file 100 signals an overlap with a second two-dimensional character string file 102. In this case, "Epson" becomes the point where the second two-dimensional coded character string file 102 is linked to the end of the two-dimensional coded character string file 100 to form a third two-dimensional coded character string file 104. How the case shown in FIG. 6A is handled by the invention is described below.

Figure 7:
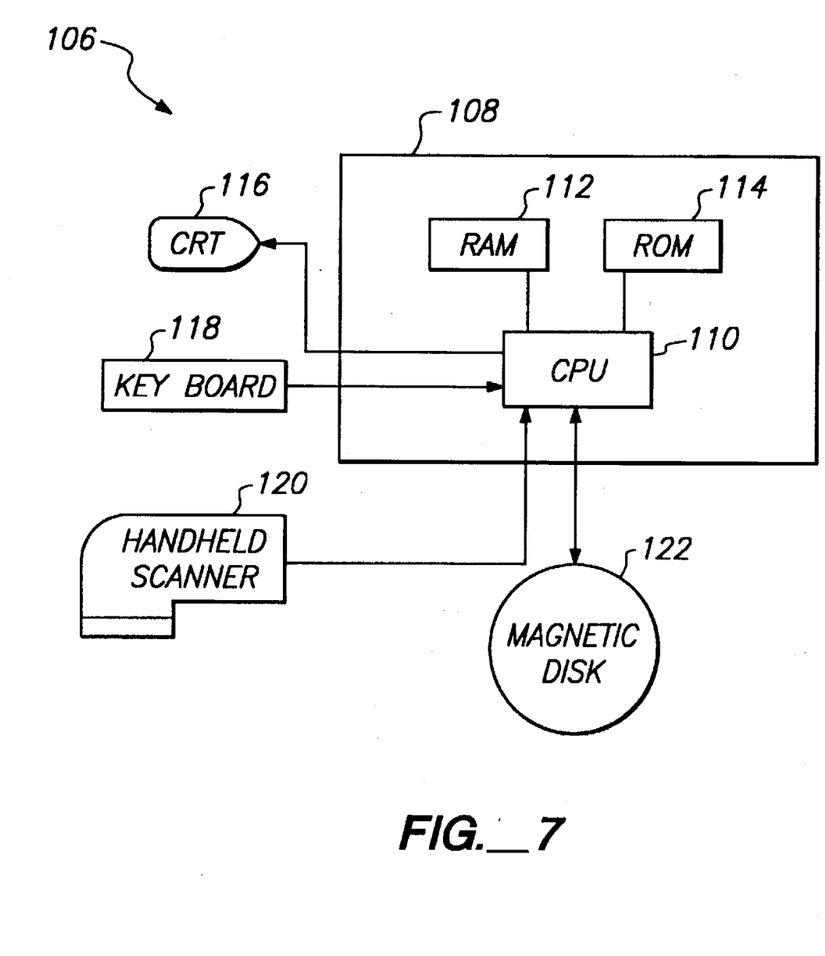
FIG. 7 is a block diagram of the two-dimensional file linker hardware of FIG. 1.

Many of the elements and steps recited above can be implemented using a computer system 106, shown in FIG. 7, comprising a personal computer (PC) 108 having a CPU 110, a RAM 112, and a ROM 114. CPU 110 can function as the control means 22, and RAM 112 can replace memories 14, 16, and 26. PC 108 has a CRT 116 to display string files, and the like, a keyboard 118 for accepting user input commands, a handheld scanner 120 for reading-in documents (e.g., 32 in FIG. 1), and a magnetic disk 122 for saving input data read by the handheld scanner 120.

A linker constructed according to a second embodiment of the present invention comprises the two-dimensional random access memories 14 and 16 to hold first and second two-dimensional coded character string files having rows and columns, aligner 20 for matching the contents of the end of the first two-dimensional coded character string files with an arbitrary selection from the second two-dimensional coded character string files, and the control means 22 for generating a signal that indicates an overlapping portion of the second two-dimensional coded character string file. When the aligner 20 finds "no match" and the control means 22 does not receive an end marker signal from the random access 18, the random access 18 moves on to access the next selection from the second two-dimensional coded character string file. When the aligner 20 finds "no match", and the control means 22 receives an end marker from the random access 18, a signal indicating the beginning of the second two-dimensional coded character string file is generated. The linking means 24 inspects the entire first two-dimensional coded character string file from the first memory 14, then inspects data indicated by a signal from the control means 22 to the end of the second memory 16, and then links the first and second two-dimensional coded character string files.

According to the present invention, the random access 18 reads out the end of a row or column in a first two-dimensional coded character string file in the first memory 14. An arbitrary part of a second two-dimensional coded character string file in the second memory 16 is accessed. The aligner 20 collates, or aligns them. When a match is found, a mark is inserted in the second file. When no match is made, no end-of-file (EOF) mark will appear. When the alignment results from the aligner 20 finding "no match" and an end marker is received from the random access 18, a signal indicating a starting point at the head of the second two-dimensional coded character string file is generated. The linking means 24 reads out the entire first two-dimensional coded character string file from the first memory 14, and also reads out data from the starting point indicated by the signal from the control means 22 to the end of the second two-dimensional coded character string file from the second memory 16. The linker means 24 then links the second two-dimensional coded character string file to the end of the first two-dimensional coded character string file.

Several methods may be used to simply and effectively join two or more two-dimensional coded character string files. A convention can be adopted wherein the first file's last row and/or column represents the limit of rows and columns to be effectively eliminated from the second file. Each row of the second file can be scanned column-by-column to find where the second file contains no duplications. A mark (e.g., end-of-file or a header mark) can be placed at that point in each row to indicate the joining or uniting point. If done on a row-by-row basis, as suggested here, the left and right edges of the file limits need not necessarily be perpendicular with the rows. This situation can occur when a first pass of the scanner is not parallel to a second pass of the scanner on the same document.

The solution just described works for vertical strokes of the scanner more-or-less following column lines. The situation involving horizontal strokes of the scanner along row lines where the strokes are not parallel to one another or the rows can also happen. The comparison of data between the first and second files will preferably not expect a match along 100% of a column or row close to the edge of the particular scan. In addition, a first file capturing rows 1 to 20 between columns 1 to 80 could conceivably need to be joined to a second file that captured rows 19 to 40 between columns 3 to 90. In this case, the scans were both parallel to one another and square to the rows and columns, but the second file is skewed 2 columns to the right. The second file overlaps the last two rows (19–20) of the first. Therefore, the proper range of match between the first and second files is the intersection, rows 19–20 between columns 3–80.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A two-dimensional file linker for coded character string files developed through character recognition of plural scanned characters within a document, comprising:

a memory configured for storing first and second coded character string files, each of the first and second coded character string files being stored as a two-dimensional array of coded characters, each coded character corresponding to at least one of the plural scanned characters;

accessing means in communication with said memory, said accessing means accessing the coded characters commencing with at least one of an end row and an end column of the first coded character string file and for accessing any row or column of the second coded character string file, said accessing means comprising:

a determining means for determining when coded character duplications exist within the accessed rows or columns of the first and second coded character string files independent of image coordinates of the corresponding plural scanned characters; and a file insertion means in communication with said determining means and configured for inserting an end-of-file (EOF) mark in the second coded character string file when an end of duplication of coded characters is detected in the accessed rows and columns of the first and second coded character string files;

alignment means in communication with said accessing means and said memory and configured for locating a row and column arrangement of the first coded character string file intersecting the second coded character string file based on a position of the EOF mark;

a controller in communication with said accessing means and said memory, said controller marking a starting point in the second coded character string file as a beginning position of the second coded character string file in the absence of the EOF mark therein; and linking means in communication with said memory and alignment means to form a third coded character string file free of character overlap based on the presence of one of the EOF and starting point marks in said second coded character string file.

2. A two-dimensional file linker for coded character string files, comprising:

a scanner for scanning plural characters within a document, said scanner generating a first set of character image data from a first scan of the document and a second set of character image data from a second scan of the document, said first and second sets of character image data being coordinate independent of a common absolute coordinate system referencing the document;

a character recognition unit in communication with said scanner for converting the first and second sets of character image data into corresponding first and second coded character string files;

a memory in communication with said character recognition unit and configured for at least temporarily storing the first and second coded character string files, each of the first and second coded character string files being stored as a two-dimensional array of coded characters;

accessing means in communication with said memory, said accessing means accessing the coded characters commencing with at least one of an end row and an end column of the first coded character string file and for accessing any row or column of the second coded character string file, said accessing means comprising:
- a determining means for determining when coded character duplications exist within the accessed rows or columns of the first and second coded character string files; and
- a file insertion means in communication with said determining means, said file insertion means inserting an end-of-file (EOF) mark in the second coded character string file when an end of duplication of coded characters is detected in the accessed rows and columns of the first and second coded character string files;

alignment means in communication with said accessing means and said memory and configured for locating a row and column arrangement of the first coded character string file intersecting the second coded character string file based on a position of the EOF mark;

a controller in communication with said accessing means and said memory, said controller marking a starting point in the second coded character string file as a beginning position of the second coded character string file in the absence of the EOF mark therein; and linking means in communication with said memory and alignment means to form a third coded character string file free of character overlap based on the presence of one of the EOF and starting point marks in said second coded character string file.

3. The file linker of claim 2, wherein said character recognition unit converts the first and second sets of character image data into corresponding first and second coded character string files using ASCII code representations of the character image data.

4. A two-dimensional linker for coded character string data, comprising:
- a scanner for scanning plural characters within a document, said scanner generating a first set of character image data from a first scan of the document and a second set of character image data from a second scan of the document, said first and second sets of character image data being coordinate independent of a common absolute coordinate system referencing the document;
- a character recognition unit in communication with said scanner, said character recognition unit converting the first and second sets of character image data into corresponding first and second coded character string data, each of the first and second coded character string data defining respective rows and columns of coded characters;
- a memory in communication with said character recognition unit and configured to store the first and second coded character string data;
- accessing means in communication with said memory, said accessing means accessing the coded characters commencing with at least one of an end row and an end column of the first coded character string data and accessing any row or column of the second coded character string data, said accessing means comprising:
  - comparing means in communication with said memory, said comparing means comparing an accessed coded character string arrangement within the first coded character string data to the second coded character string data;
  - determining means responsive to said comparing means for determining whether the accessed coded character string corresponds to at least a portion of the second coded character string data; and
  - alignment means in communication with said memory and said determining means, said alignment means aligning corresponding rows and columns between the first and second coded character string data; and
- linking means in communication with said memory and said accessing means, said linking means combining the first and second coded character string data into a coded character string file substantially free of character overlap based on the aligned corresponding rows and columns.

5. The linker of claim 4, wherein the first and second coded character string data each have top, left, right and bottom edges, with at least some coded characters in the first coded character string data overlapping coded characters along at least a portion of one edge of the second coded character string data, wherein said accessing means recognizes duplicated coded characters along said overlapping edges between the first and second coded character string data resulting from adjacent overlapping image areas.

6. The linker of claim 4, wherein said accessing means inserts a terminator mark at an end of the second coded character string data when the second coded character string data has been completely accessed without finding the accessed coded character string arrangement.

7. A method for linking coded character string files developed through character recognition of plural scanned characters within a document, comprising:
- scanning a first area of the document to obtain a first set of character image data;
- scanning a second area of the document to obtain a second set of character image data, the first and second sets of character image data being coordinate independent of a common absolute coordinate system referencing the document;
- recognizing and converting the first and second sets of character image data obtained in said scanning steps into the first and second coded character string files respectively;
- storing the first and second coded character string files into memory, each of the first and second coded character string files being stored as a two-dimensional array defining rows and columns of coded characters, each coded character corresponding to at least one of the plural scanned characters;
- selecting a first substring of coded characters within at least one of an edge row and an edge column of the first coded character string file;
- determining whether a second substring of coded characters substantially equivalent to said first substring is present in said second coded character string file;
- performing one of:
  - inserting an end-of-file (EOF) mark in the second coded character string file after the second substring when the second substring is determined to be present in the second coded character string file in said determining step; and
  - inserting the EOF mark at an end of the second coded character string file when the second substring is determined not to be present in the second coded character string file in said determining step;
- aligning corresponding rows and columns of coded characters of the first and second coded character string files in coded character-wise manner based on the location of the EOF mark within said second coded character string file; and linking the first and second coded character string files together based on the corresponding rows and columns aligned in said aligning step to form a third coded character string file substantially free of coded character string overlap.

8. The method of claim 7, wherein said recognizing and converting step includes the step of generating ASCII code representations of the character image data to form the coded characters.

9. A method for linking coded character string files developed through character recognition of plural scanned characters within a document, comprising:

storing first and second coded character string files within memory, each of the first and second coded character string files being stored as a two-dimensional array of coded characters, each coded character corresponding to at least one of the plural scanned characters;

accessing the stored coded characters commencing with at least one of an end row and an end column of the first coded character string file and any row or column of the second coded character string file, said accessing step including the steps of:

determining when coded character duplications exist within the accessed rows or columns of the first and second coded character string files independent of image coordinates of the corresponding plural scanned characters; and selectively inserting an end-of-file (EOF) mark in the second coded character string file when an end of duplication of coded characters is determined in said determining step;

locating a row and column arrangement of the first coded character string file intersecting the second coded character string file based on a position of the EOF mark inserted in said inserting step;

placing a starting point mark in the second coded character string file as a beginning position of the second coded character string file in the absence of the EOF mark being inserted in said inserting step; and forming a third coded character string file free of character overlap based on the presence of one of the EOF and starting point marks in said second coded character string file.

10. A method for linking coded character string files, comprising the steps of:

scanning plural characters within a document and generating a first set of character image data from a first scan of the document and a second set of character image data from a second scan of the document, the first and second sets of character image data being coordinate independent of a common absolute coordinate system referencing the document;

converting the first and second sets of character image data into corresponding first and second coded character string files;

storing the first and second coded character string files within memory, each of the first and second coded character string files being stored as a two-dimensional array of coded characters;

accessing the coded characters commencing with at least one of an end row and an end column of the first coded character string file and any row or column of the second coded character string file, said accessing step including the steps of:

determining when coded character duplications exist within the accessed rows or columns of the first and second coded character string files; and inserting an end-of-file (EOF) mark in the second coded character string file when an end of duplication of coded characters is detected in the accessed rows and columns of the first and second coded character string files;

locating a row and column arrangement of the first coded character string file intersecting the second coded character string file based on a position of the EOF mark;

marking a starting point in the second coded character string file as a beginning position of the second coded character string file in the absence of the EOF mark being inserted therein in said inserting step; and forming a third coded character string file free of character overlap based on the presence of one of the EOF and starting point marks in said second coded character string file.

11. The method of claim 10, wherein said converting step comprises converting the first and second sets of character image data into corresponding first and second coded character string files using ASCII code representations of the character image data.

12. A method for linking coded character string data developed through character recognition of plural scanned characters within a document, comprising the steps of:

obtaining a first set of character image data from a first scan of the document and a second set of character image data from a second scan of the document, the first and second sets of character image data being coordinate independent of a common absolute coordinate system referencing the document;

recognizing and converting the first and second sets of character image data obtained in said obtaining step into corresponding first and second coded character string data, each of the first and second coded character string data defining respective rows and columns of coded characters;

storing the first and second coded character string data within memory;

accessing the first and second coded characters stored within memory commencing with at least one of an end row and an end column of the first coded character string data and accessing any row or column of the second coded character string data;

comparing an accessed coded character string arrangement within the first coded character string data to the second coded character string data;

determining whether the accessed coded character string arrangement corresponds to at least a portion of the second coded character string data;

aligning corresponding rows and columns between said first and second coded character string data as determined in said determining step; and combining the first and second coded character string data into a coded character string file substantially free of character overlap based on the aligned corresponding rows and columns.

13. The method of claim 12, wherein the first and second coded character string data each have top, left, right and bottom edges, with at least some coded characters in the first coded character string data overlapping coded characters along at least a portion of one edge of the second coded character string data; and wherein said determining step comprises recognizing duplicated coded characters along the overlapping edges between the first and second coded character string data resulting from adjacent overlapping image areas.

14. The method of claim 12, further comprising the step of inserting a terminator mark at an end of the second coded character string data when the second coded character string data has been completely accessed in said accessing step without finding the accessed coded character string arrangement as determined in said comparing and determining steps.

15. A computer useable program product for use with an information processor to link coded character string data developed through character recognition of plural scanned characters within a document, the computer useable program product comprising:

computer readable program code means for obtaining a first set of character image data from a first scan of the document and a second set of character image data from a second scan of the document, the first and second sets of character image data being coordinate independent of a common absolute coordinate system referencing the document;

computer readable program code means for recognizing and converting the first and second sets of character image data obtained in said obtaining step into corresponding first and second coded character string data, each of the first and second coded character string data defining respective rows and columns of coded characters;

computer readable program code means for storing the first and second coded character string data within a memory;

computer readable program code means for accessing the first and second coded characters stored within said memory commencing with at least one of an end row and an end column of the first coded character string data and accessing any row or column of the second coded character string data;

computer readable program code means for comparing an accessed coded character string arrangement within the first coded character string data to the second coded character string data;

computer readable program code means for determining whether the accessed coded character string arrangement corresponds to at least a portion of the second coded character string data;

computer readable program code means for aligning corresponding rows and columns between said first and second coded character string data as determined by said determining means; and computer readable program code means for combining the first and second coded character string data into a coded character string file substantially free of character overlap based on the aligned corresponding rows and columns.

16. The computer useable program product of claim 15, wherein the first and second coded character string data each have top, left, right and bottom edges, with at least some coded characters in the first coded character string data overlapping coded characters along at least a portion of one edge of the second coded character string data; and wherein said determining means comprises computer readable program code means for recognizing duplicated coded characters along the overlapping edges between the first and second coded character string resulting from adjacent overlapping image areas.

17. The computer useable program product of claim 15, further comprising computer readable program code means for inserting a terminator mark at an end of the second coded character string data when the second coded character string data has been completely accessed in said accessing step without finding the accessed coded character string arrangement as determined in said comparing and determining steps.

* * * * *